July 15, 1958   A. G. CLARK   2,842,937
AIRCRAFT ENGINE CARTRIDGE STARTER CONTROL SYSTEM
Filed Sept. 1, 1955
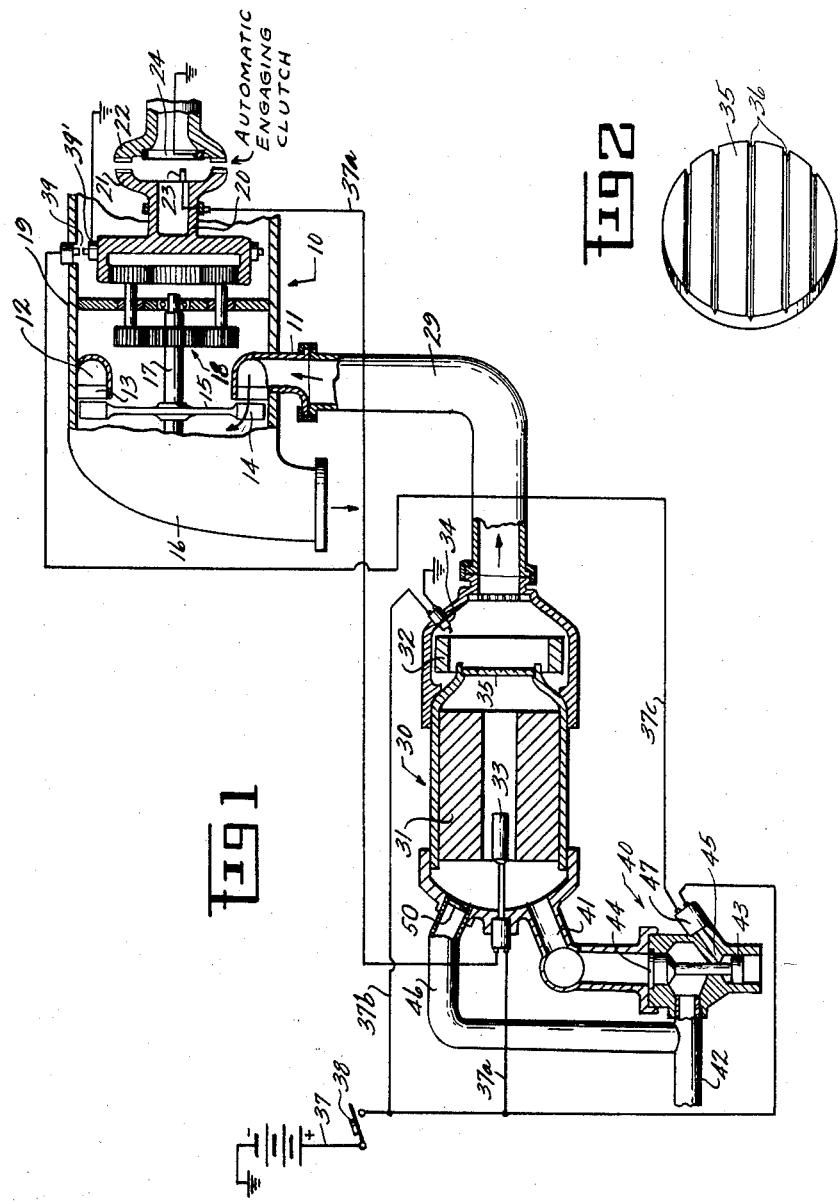
INVENTOR.
ALBERT G. CLARK
BY
Edward M. Title
HIS ATTORNEY

United States Patent Office 2,842,937
Patented July 15, 1958

2,842,937

AIRCRAFT ENGINE CARTRIDGE STARTER CONTROL SYSTEM

Albert George Clark, Ballston Lake, N. Y., assignor to General Electric Company, a corporation of New York Application September 1, 1955, Serial No. 532,018

6 Claims. (Cl. 60—39.14)

This invention relates to cartridge starters for combustion engines and particularly to means for preventing starter overspeed and reducing clutch engagement shock during the initial period of the starting cycle.

Particularly in aircraft service, it is customary and desirable to provide turbine-type starter motors for aircraft power plants which use motive fluid generated by the combustion of a charge of a solid propellant of any common type, such as those used in rocketry, in a confined space so as to form gases under pressure. This type of starter, which is commonly referred to as a cartridge starter, comprises a high speed fluid turbine which drives the reciprocating or gas turbine engine to be started through a speed reduction gear train and a unidirectional clutch to accelerate the engine to its starting speed. Since modern aircraft power plants have moving parts of considerable mass, the expenditure of substantial amounts of energy is required in order to effect starting. One of the major problems in the development of high energy starters is the protection against overspeed of the starter turbine in the event of a failure of the clutch to engage the engine upon firing of the starter.

Another problem is encountered when it is desired to restart an engine which is already running at some speed below the minimum self-sustaining speed of the engine. With the engine already running in this manner, the starter will accelerate very rapidly up to the speed of the engine, so that the shock upon clutch engagement is likely to be very serious which could result in clutch failure.

If, during the starting cycle after clutch engagement, the clutch should fail or for any reason become disengaged, serious overspeeding could result because of the fact that the physical proportions of the starter are usually such that rotating parts have little inertia and considerable amounts of energy are supplied to the starter so that very rapid acceleration results. Therefore in order to prevent serious overspeeding, an overspeed device must be employed which is capable of acting in a very short time in order to prevent the turbine from reaching speeds at which the rotor stresses become exceedingly dangerous. Accordingly, it is an object of this invention to provide an improved cartridge starter which obviates the above mentioned difficulties.

Another object of the invention is to provide a cartridge arrangement for a cartridge starter which permits clutch engagement at the initiation of the starting cycle without serious shock.

Still another object of the invention is to provide a quick-acting, reliable means for preventing overspeed in cartridge type starters. These and other objects of the invention may be realized by the provision of a system including an auxiliary charge of propellant in addition to the main propellant charge which is ignited upon the initiation of the starting cycle prior to the ignition of the main charge and means for bypassing the flow of motive fluid to the turbine in the event of overspeed.

The invention will be better understood from the following description taken in connection with the accompanying drawing in which:

Fig. 1 is a schematic illustration of one embodiment of the invention; and

Fig. 2 is a perspective view of a one-way blow out disk which is used in the breech.

Referring to Fig. 1, the turbine starter indicated generally at 10 comprises a casing 19 enclosing a turbine having an inlet 11 through which inlet gases under pressure are introduced to a nozzle box 12. From the nozzle box 12, the gases expand through nozzles 13 and then flow through turbine blades 14 on a rotor 15, the exhaust gases leaving through an exhaust casing 16. The turbine rotor 15 rides on a shaft 17 which may be formed integrally therewith as shown or which may be secured thereto by suitable key or spline means. The rotor shaft 17 is rotatably mounted in suitable bearings which are supported from the starter casing 19. The turbine rotor shaft 17 is connected to a starter output shaft 20 through an intermediate speed reduction gear train generally indicated at 18 within the starter casing 19. Connected to the starter output shaft 20 is a unidirectional clutch comprising a driving or starter member 21 and driven or engine member 22 which allows transmission of torque from the starter to the engine but does not provide for transmisison of torque in the reverse direction. The clutch is one of the automatically engaging type, the initial rotation of the starter operating to move the clutch members 21 and 22 axially towards each other into engagement. One form of such a clutch is described with greater particularity in a copending application of Dallas E. Cain and George H. Frye, Jr., Serial No. 326,504, filed December 17, 1952, having subsequently issued on June 26, 1956 as Patent 2,752,023, and assigned to the assignee of the present application. An electrical switch having a normally open electrical contact 23 is mounted on one of the clutch dogs shown in the drawing as the dog 21 while a contact ring 24 is mounted on the other clutch dog 22 so as to be actuated by the relative axial movement of the clutch dog upon engagement so that electrical continuity is established therethrough only when the clutch is engaged.

The motive gases used to drive the turbine unit 10 are generated in a breech enclosure indicated generally at 30 in which one or more charges of a solid propellant are burned. Hot gases are conducted from the breech 30 to the turbine inlet 11 through a fluid conductor 29. Preparatory to firing the starter, two charges of propellant material 31 and 32 are placed within the breech as shown in the drawing. The charges 31 and 32 are provided with electrically actuated ignition charges 33 and 34 respectively of any common form. A one-way blow out disk 35 is located in the breech separating the interior thereof into two separate chambers each of which contains one of the charges 31 and 32. A preferred form of one-way blow out disk is illustrated in Fig. 2. Referring to Fig. 2 it will be noted that one surface of the disk which is made from thin brass stock which has notches 36 on one surface so that when fluid pressure is applied to the notched side the disk will withstand greater pressure than when pressure is applied to the reverse side. The one-way blow out disk 35 is mounted in the breech so that it will be ruptured by a relatively low pressure in the portion of the breech housing the charge 31 whereas it will not rupture as easily in the other direction when fluid pressure is developed in that portion of the breech enclosure 30 which contains the charge 32. The electrical igniters 33 and 34 are connected electrically in parallel across a source of electrical energy by conductors 37a and 37b. A normally open electrical starting switch 38 connected in series with the conductor 37 operates as a start switch for the system. The electrical contacts 23 and 24 carried by the clutch members 21 and 22 are connected electrically in series with conductor 37a including the electrical igniter 33.

Additional protection against overspread of the starter and over pressure in the breech is provided by a blow out valve which is shown generally at 40. The blow out valve communicates with the interior of the breech 30 to a fluid conductor 41. Communication between the fluid conductor 41 and a fluid conductor 42 communicating with the surrounding atmosphere is normally obstructed by a movable valve member 43 which is held in the position shown in the drawing by a shear flange 44, and a small electrically actuated charge 47 of black powder or some other rapid burning composition is located in communication with a small chamber 45 formed by the valve housing and the lower part of the movable valve member 43. The shear flange 44 is designed so that when the charge 47 is ignited the pressure created in the chamber 45 will cause the shear flange to shear permitting the valve member 43 to move downward so as to provide communication between the fluid conductors 41 and 42. A second fluid conductor 46 provides fluid communication between the interior of the breech 30 and the conductor 42, an over pressure disk 50 being incorporated in the conductor which will rupture when the pressure within the breech exceeds a maximum safe value. The charge 47 is connected electrically in parallel with the charges 31 and 32 by an electrical conductor 37c which is connected electrically in series with a centrifugally operated overspeed switch 39 which has normally open electrical contacts which are closed by spring biased mass which rotates with one of the rotating parts in the starter and moves radially outward against the biasing force of a spring when the speed of the rotating member exceeds a predetermined maximum of speed.

With the system thus described, the operation is as follows. To initiate the starting cycle the switch 38 is closed completing a series electrical circuit including the electrical source, conductors 37 and 37b and igniter 34 causing the ignition of the charge 32. The charge 32 is designed to have a smaller burning surface than charge 31 so that the flow rate as well as total quantity of hot gases generated by combustion of the charge 32 is relatively small in comparison to that resulting from combustion of the larger charge 31. The supply of gases from the combustion of charge 32 is sufficiently large in flow rate and duration of time in order to develop sufficient power in passing through the blades 14 of the turbine rotor 15 to cause the clutch to engage. The rate at which these gases are supplied is, on the other hand, low enough to prevent dangerous clutch engagement shock when the clutch engages or dangerous overspeeding in the event the clutch for some reason should fail to engage. With engagement of the clutch the contacts 23 and 24 are closed completing the circuit through the conductor 37a and igniter 33 to cause ignition of the charge 31. As pressure builds up within the breech 30 the one-way blow out disk 35 is ruptured and the products of combustion flow through the fluid conductor 29 to the turbine inlet 11. The charge 31 is designed to supply hot gases to the turbine at a flow rate larger than supplied by the charge 32 and sufficient to develop adequate power in the turbine rotor 15 to bring the engine rotor up to its starting speed within the desired starting time which is governed by the burning time of the charge 31.

If for any reason whatever the starter should rotate at a speed greater than a predetermined maximum safe speed, the mass 39' will move radially outward under the influence of centrifugal force causing the switch 39 to close completing electrical circuit through the conductor 37c including the charge 47. Ignition of the charge 47 will cause a pressure to be developed on the movable valve member 43 causing it to move downward after shearing the shear flange 44 thus providing fluid communication between the interior of the breech 30 and the exhaust conductor 42 so that the hot gases flow overboard through the fluid conductor 42 rather than through the turbine. Thus a further increase in the speed of the turbine is prevented.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. In combination with a turbomachine for driving a load, an automatically engageable clutch between an output shaft of said turbomachine and said load, a breech enclosure adapted to receive first and second charges of a combustible material, said second charge being larger than said first charge, fluid conduit means connected between said breech enclosure and a motive fluid inlet for said turbomachine to provide fluid communication therebetween, means for igniting said first charge, and ignition means for igniting said second charge including means actuated by the engagement of said clutch.

2. In combination with a turbine starter for power plants, the combination of a disengageable clutch in driving relationship between an output shaft of said starter and a rotating member of said power plant, a confined enclosure adapted to receive first and second combustible charges, first and second electrically actuated ignition means for said first and second charges respectively, first electrical conductor means including a first switch connected to said first ignition means and adapted to be connected to a source of electrical energy, second electrical conductor means connected to said second ignitor means and adapted to be connected to a source of electrical energy having said second electrical conductor, and a second switch with normally open contacts electrically in series therewith which are closed by the motion of a clutch member when the clutch is engaged.

3. A system for controlling the supply of motive fluid to a turbine starter for an engine comprising a breech enclosure adapted to receive two combustible charges, a fluid conductor providing fluid communication between one end of said breech enclosure and a motive fluid inlet for said turbine starter, a frangible partition mounted in said breech enclosure so as to separate said breech enclosure into two chambers to prevent fluid communication therebetween, means for igniting said first charge, and means actuated by the engagement of said clutch for igniting said second charge.

4. A system for controlling the supply of motive fluid to a turbine starter for an engine comprising a breech enclosure adapted to receive two combustible charges each having electrically actuated igniting means, a first fluid conductor providing fluid communication between the interior of said breech enclosure and a motive fluid inlet for said turbine starter, a second fluid conductor including a valve providing fluid communication between the interior of said breech enclosure and the surrounding atmosphere, said valve being normally closed, means for sensing the speed of a rotating member of said starter and providing an overspeed signal when the sensed speed exceeds a predetermined value, valve actuating means to open said valve in response to said overspeed signal to vent the breech enclosure to atmosphere, means for supplying electrical energy to one of said igniting means including a manually operated switch, and means for supplying electrical energy to the other of said charges including a switch actuated by the engagement of said clutch.

5. A system for controlling the supply of motive fluid to a turbomachine having an inlet for motive fluid and disengageable clutch comprising enclosure means adapted to contain first and second combustible charges having first and second electrically actuated ignition means respectively, fluid conducting means connected between said enclosure means and said turbomachine inlet, first electrical conductor means adapted to interconnect a source of electrical energy and said first electrically actuated igniting means, said conductor means including a manually operable electrical switch and second electrical conductor means adapted to interconnect a source of electrical energy and said second igniting means, said second electrical conductor means including an electrical switch actuated by the engagement of said clutch.

6. Apparatus in accordance with claim 5 in which said second combustible charge is designed to generate hot gases at a higher flow rate than said first charge.

References Cited in the file of this patent

UNITED STATES PATENTS

| | | |
|---|---|---|
| 2,518,882 | Goddard | Aug. 15, 1950 |
| 2,559,006 | Clapham | July 3, 1951 |